United States Patent [19]

Nelson

[11] Patent Number: 6,131,727
[45] Date of Patent: Oct. 17, 2000

[54] CONVEYOR BELT MONITOR

[76] Inventor: David W. Nelson, P.O. Box 764, Coal City, W. Va. 25823

[21] Appl. No.: 09/232,706

[22] Filed: Jan. 19, 1999

Related U.S. Application Data

[60] Provisional application No. 60/088,847, Jun. 10, 1998.

[51] Int. Cl.[7] .................................................. B65G 43/00
[52] U.S. Cl. ................................. 198/810.02; 198/810.04
[58] Field of Search ............................ 198/502.1, 502.4, 198/810.02, 810.04

[56] References Cited

U.S. PATENT DOCUMENTS

| | | |
|---|---|---|
| 2,345,415 | 3/1944 | Nagy, Jr. . |
| 2,510,163 | 6/1950 | Wood ..................................... 198/502.4 |
| 4,088,222 | 5/1978 | Hurt ....................................... 198/502.4 |
| 4,258,840 | 3/1981 | Conkle ................................... 198/502.4 |
| 4,462,523 | 7/1984 | Kerr . |
| 4,564,099 | 1/1986 | Uozumi . |
| 5,647,640 | 7/1997 | Heintzmann et al. . |

FOREIGN PATENT DOCUMENTS

| | | |
|---|---|---|
| 2017949 | 10/1971 | Germany . |
| 4011257 | 1/1991 | Germany . |
| 6-24538 | 2/1994 | Japan . |
| 1033401 | 8/1983 | U.S.S.R. . |
| 1542873 | 2/1990 | U.S.S.R. . |

*Primary Examiner*—Joseph E. Valenza
*Attorney, Agent, or Firm*—Richard C. Litman

[57] ABSTRACT

The conveyor belt monitor is composed of a pair of rollers resiliently mounted on a frame vertically aligned above and below the conveyor belt and which extend horizontally across the width of the belt, positioned on the return loop of the belt. The rollers are movable vertically in a direction perpendicular to the direction of belt movement. The roller shafts are connected to limit switches so that an upward movement of the top roller or a downward movement of the bottom roller shuts down the conveyer and, optionally, signals an alarm to the operator of the belt. The sensitivity of the monitor, or clearance between the belt and the rollers, is adjustable by the operator.

7 Claims, 6 Drawing Sheets

CONVEYOR BELT MONITOR

CROSS-REFERENCE TO RELATED APPLICATION

This application claims the benefit of U.S. Provisional Patent Application Ser. No. 60/088,847, filed Jun. 10, 1998.

BACKGROUND OF THE INVENTION

1. Field of the Invention

The present invention relates to bulk goods transport apparatus, and particularly describes a conveyor belt monitor for detecting loosened belt splices, tears, and other irregularities in conveyor belts before the belt breaks and shuts down the conveyor.

2. Description of Related Art

Conveyor machinery for transporting bulk goods, packaged goods, and other items are well known and appear in a variety of forms, depending on their application. The present invention relates to belt conveyors which may be used, for example, in the coal mining industry to transport bulk coal up an incline from a coal seam in an underground mine to a point where it may be discharged either onto another conveyor belt or into a rail car. Such a conveyor belt may span a length of 1,500 feet to 5,000 feet.

A typical belt conveyor consists of a supporting structure or frame; a continuous or endless belt of fabric made from leather, rubber, or leather and cotton duck impregnated with rubber and built up in plies with a rubberized covering; a plurality of cylindrical pulleys or drums to support and tension the belt, including a head drum, a tail drum and one or more idler drums; and a drive system, often a motor with gearing or a chain and sprocket assembly attached to a drive drum, which may also be the head drum.

Various problems arise with maintenance of the fabric belt occurring from wear and tear and the rough usage conditions associated with operation under difficult environmental conditions. Fabric belts may develop tears, which are repaired by joining a seam running across the belt, either by means of a plurality of metal splices having teeth penetrating the fabric and catching on opposing ends of the seam, often secured by rivets, or by a vulcanizing splice using an adhesive secured by heating the joint to secure the opposing ends of the seam. Over time the metal splices may become loosened, projecting out of the belt and weakening the belt, or the vulcanized splice may have a ply of the belt curl back and tear from repeated friction. If either of these conditions are not discovered by ordinary maintenance, they will eventually cause the belt to break, dropping the load of bulk goods and shutting down the conveyor until repairs can be made and the spillage cleaned up. When the breakage occurs in the seam of an underground mine with a low ceiling, repair and clean up operations can cause extended interruption of normal mining operations. Clearly early warning of an impending break in the belt is desirable.

Other problems that can occur include twisting of the belt, misalignment of the belt, and slippage. Twisting of the belt can occur from foreign objects, such as wood and metal scraps, becoming lodged temporarily at the tailpiece or head, causing one side of the belt to move faster than the other, and eventually the belt twists so the one side partially overlaps the other. Misalignment can occur from the same cause, with one side of the belt shifting off the drums, shifting increasing due to the weight of the cargo load, causing spillage of bulk materials onto the return loop, with eventual clogging of the drums and twisting or longitudinal tearing of the belt. Slippage occurs due to lengthening of the belt due to constant tensile and shear forces on the flexible belt.

A variety of apparatus and devices have been proposed to remedy these problems. U.S. Pat. No. 2,345,415, issued Mar. 28, 1944 to Andrew Nagy, Jr., describes a limit switch activated by a pivoting lever having a support arm attached to a plate extending across the width of the belt, positioned vertically above the belt and with very narrow clearance between the belt and the plate, so that a clamp or splice projecting from the top surface of the belt will rotate the lever and actuate the switch, shutting down the conveyor before the belt breaks.

U.S. Pat. No. 4,462,523, issued Jul. 31, 1984 to J. F. Kerr, describes a belt monitor having a cable extending below the belt from one side to the other, the cable being anchored on one side of the belt and attached to a ball and socket mechanism on the other side of the belt. When a damaged portion of a torn belt is encountered, the cable pulls the ball from the socket, causing a spring biased cam to move towards the socket, thereby tripping a pair of microswitches. One monitor may be placed below the belt on the upper run and a second monitor may be placed below the belt on the return run. At each location, the monitor must be used in pairs, one with the cable anchored at one edge of the belt, the other with the cable anchored at the other side of the belt, since a single cable only detects tears between the detector and the midline of the belt. The monitor must be rest manually by reinserting the ball in the socket after repair of the cable.

German Patent No. 4,011,257, published Jan. 31, 1991, shows a device for detecting longitudinal tears in the belt, including a pressure drum with rollers mounted at either end of the drum, the drum tapering narrowly towards the center of its axis and movable perpendicular to the direction of belt movement, tears being detected by a difference in the pressure exerted by the rollers which shuts down the machine. Soviet Invention Certificate No. 1,542,873, published Feb. 15, 1990, teaches another device for controlling longitudinal tears, having a pivotally mounted crank with two arms having rollers at the ends of the arms which are in contact with the return loop of the belt, longitudinal tears being detected as a difference in the pressure of the rollers and sounding an alarm signal.

Japanese Patent No. 6-24538, published Feb. 1, 1994, discloses a device for detecting a twisted belt having two pairs of parallel rollers mounted at a drum, the twist being detected as a difference in the radial height of the rollers. Russian Invention Certificate No. 1,033,401, published Aug. 7, 1983, describes a conveyor belt having a flexible element extending above and parallel to the belt attached to a pair of eccentrically mounted trapping drums which have projections on their surface which are positioned in close approximation to the top of the belt surface. An irregularity in the belt causes the tail roller to slide down, actuating the flexible element, causing the projections of the trapping drum to catch the belt against a plate and stop the conveyor until a stop switch can be manually operated to disconnect the drive drum.

Other conveyor safety devices and monitors are described in U.S. Pat. No. 4,564,099, issued Jan. 14, 1986 to Akira Uozumi (safety device for an escalator or other passenger conveyor warning of a difference between handrail speed and tread speed); U.S. Pat. No. 5,647,640, issued Jul. 15, 1997 to Heintzmann, et al. (device to correct sag in a chain conveyor by adjusting drive speed); and German Patent No. 2,017,949, published Dec. 28, 1971 (device to maintain measured amount of slack in chain conveyor by adjusting drive speed).

Despite the advances described in the above patents, there remain problems to be resolved. The Nagy device, for example, is mounted directly above a pulley, probably because that is the only flat portion of the upper belt path, and will therefore activate the limit switch and stop the conveyor whenever there is a load on the belt, and with bulk material, a bad splice would be covered by the bulk material and not detected. Further, the Nagy device only checks for irregularities on the outer surface of the belt; many tears begin on the inner surface of the belt. The Nagy device must be manually reset because of the construction of the lever and support arm; it would be desirable to have a device which automatically resets so the operator may restart the conveyor to move the irregularity to a convenient repair position, which may be the other end of the conveyor span. Belt twists often occur as the belt goes around the pulley; it is desirable to position the device on the return loop after the belt has gone around the pulley.

The device described by the Kerr patent must be also be manually reset, by reinserting the ball in the socket. The Kerr device also lacks sensitivity, since the cable must be set sufficiently low to account for sag in the belt caused by the load, and since the top and the bottom of the belt are not monitored simultaneously. Hence a tear in the belt may ride over the tear until the belt is at the point of rupture.

The German '257 patent and the Soviet '873 patents depend on rollers which press against the belt. Belt conveyors operate at speeds between 550 and 900 feet per minute. Such rollers are inclined to wear out quickly and form sharp edges, which might tear the belt. The rollers would also require high quality roller bearings which would need frequent greasing.

Consequently, an apparatus which overcomes the limitations of conventional devices is needed. None of the above inventions and patents, taken either singly or in combination, is seen to describe the instant invention as claimed.

SUMMARY OF THE INVENTION

The conveyor belt monitor is composed of a pair of rollers resiliently mounted on a frame vertically aligned above and below the conveyor belt and which extend horizontally across the width of the belt, positioned on the return loop of the belt. The rollers are movable vertically in a direction perpendicular to the direction of belt movement. The roller shafts are connected to limit switches so that an upward movement of the top roller or a downward movement of the bottom roller shuts down the conveyer and, optionally, signals an alarm to the operator of the belt. The sensitivity of the monitor, or clearance between the belt and the rollers, is adjustable by the operator.

Accordingly, it is a principal object of the invention to provide a conveyor belt monitor which monitors both sides of the belt for impending tears.

It is another object of the invention to provide a conveyor belt monitor capable of monitoring the belt in locations prone to tearing and twisting of the belt by placing the monitor in the return branch of the conveyor belt loop.

It is a further object of the invention to provide a conveyor belt monitor which is useful for monitoring the belt for loosened splices, twisted belts and misaligned belts in order to shut down the machine for repairs before breakage of the belt occurs.

Still another object of the invention is to provide a conveyor belt monitor which warns the operator of a belt irregularity and permits the operator to move the irregularity to a convenient location for repair without the necessity of manually resetting the monitor switch.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
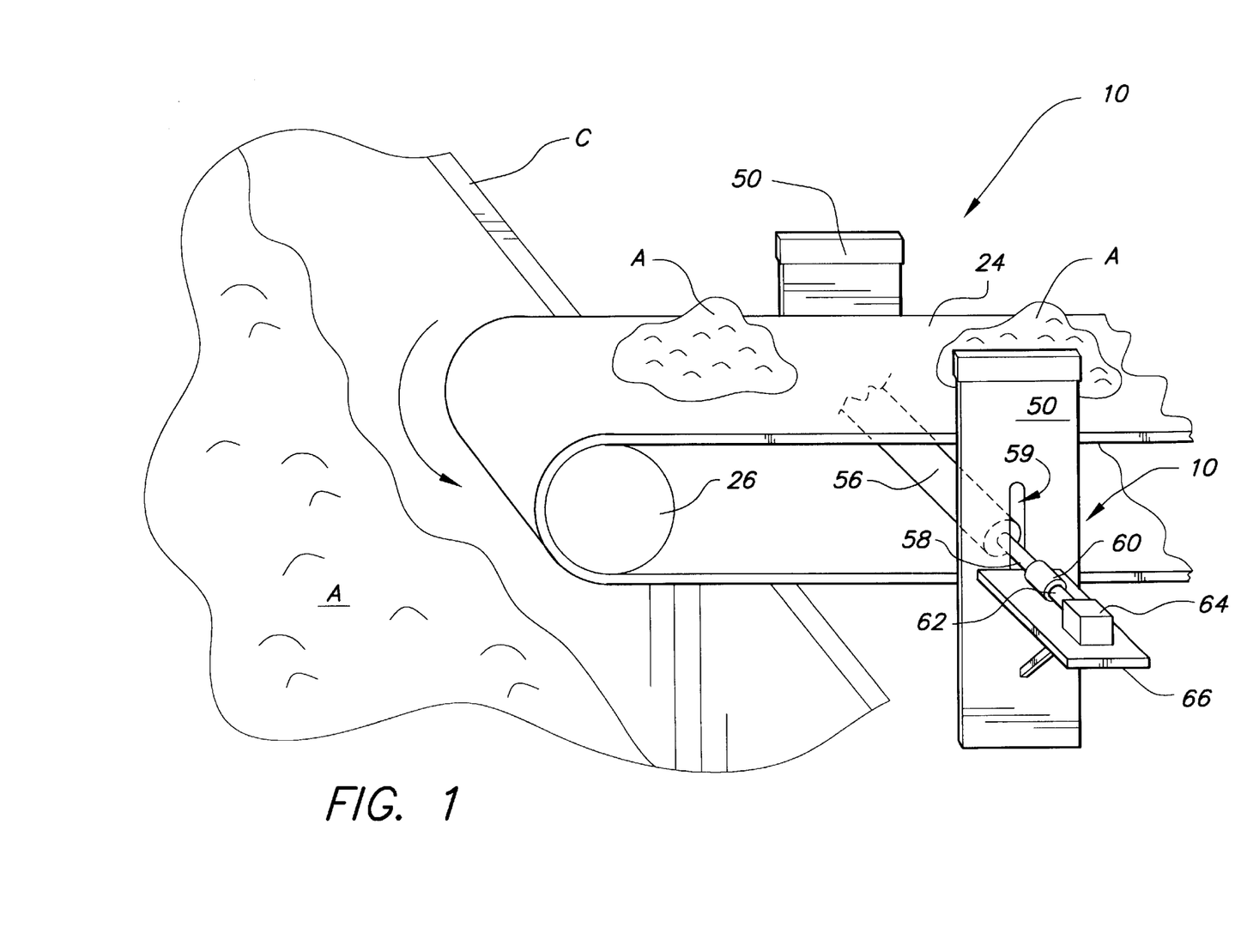
FIG. 1 is an environmental, partially fragmented perspective view of a conveyor belt monitor according to the present invention.
Figure 2:
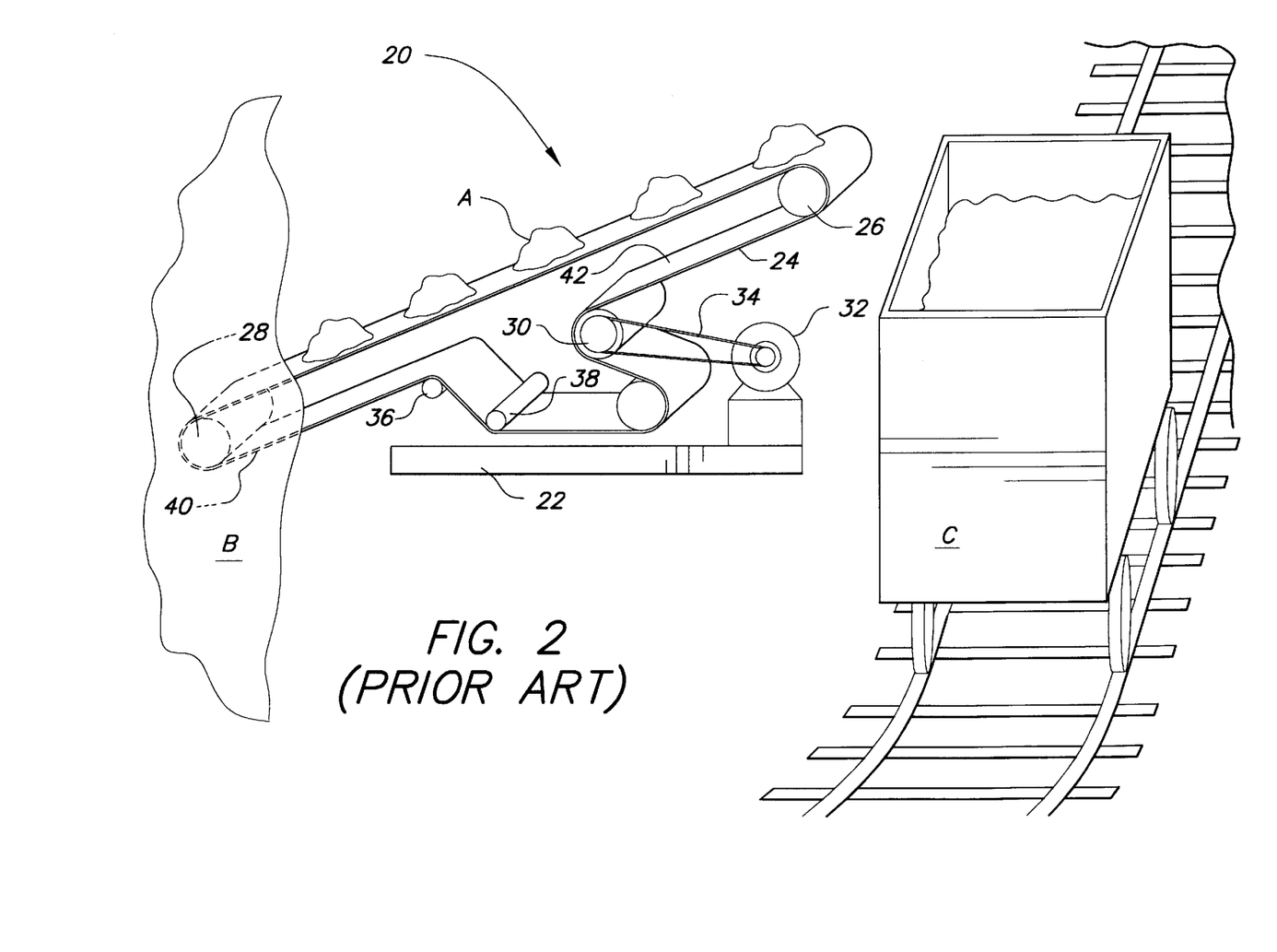
FIG. 2 is an environmental perspective view of a belt conveyor of the prior art.

The present invention is a conveyor belt monitor, designated generally as 10 in the drawings. FIG. 1 shows an environmental view of the monitor 10. FIG. 2 depicts a conventional belt conveyor, designated generally as 20, whose parts and operation are explained more fully as follows.

A typical belt conveyor 20 generally consists of a frame 22 or other supporting structure, a continuous or endless belt 24 of leather, rubber, or other flexible material with a rubberized covering, a head roller 26, also called a discharge roller or drum, a tail or take-up roller 28, and at least one drive drum 30. The drive drum 30 is powered by a motor 32, which may be coupled to the drive by a chain and sprocket assembly 34 or gearing (not shown). The conveyor 20 may include one or more snub rollers 36 for applying tension to the belt 24 and one or more idler pulleys 38. Powered conveyors offer the advantage of being capable of transporting bulk materials upwards at angles of inclination up to 28° without cleats. Conveyors 20 for carrying bulk materials will typically also include a bed of closely spaced rollers (not shown) between the head roller 26 and the tail roller 28 to form a flat or troughed conveyor bed over which the belt 24 runs. FIG. 2 offers a simplified view of an application of the conveyor 20 to transport coal A from a mine B to a railway car C.

The conveyor belt monitor 10 of the present invention is shown located near the discharge roller 26 in FIG. 1. Other suitable locations may include a position 40 near the tail roller 28, or a position 42 near the drive drum 30 as indicated in FIG. 2.

Figure 3:
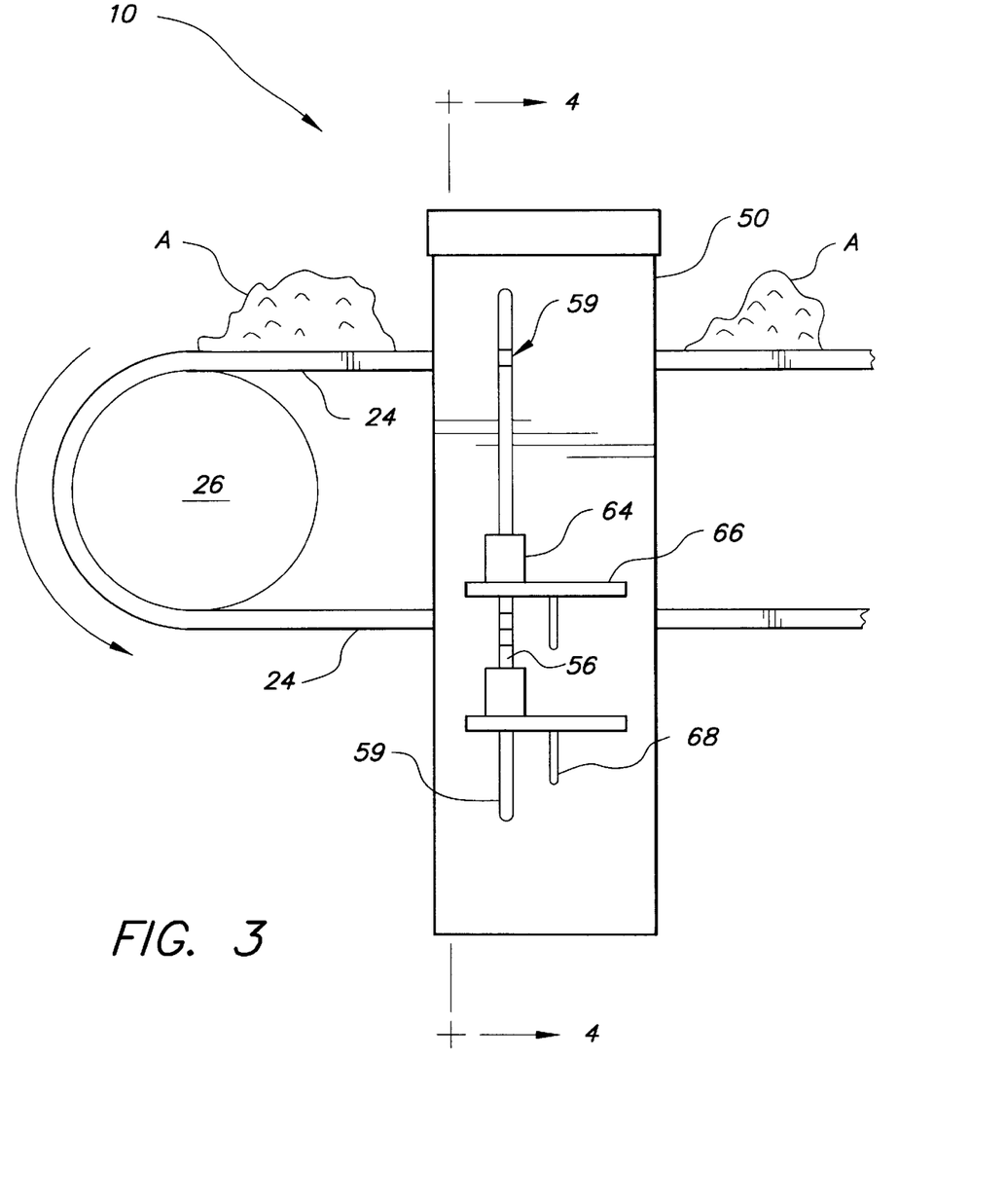
FIG. 3 is a side view of the conveyor belt monitor according to the present invention.
Figure 4:
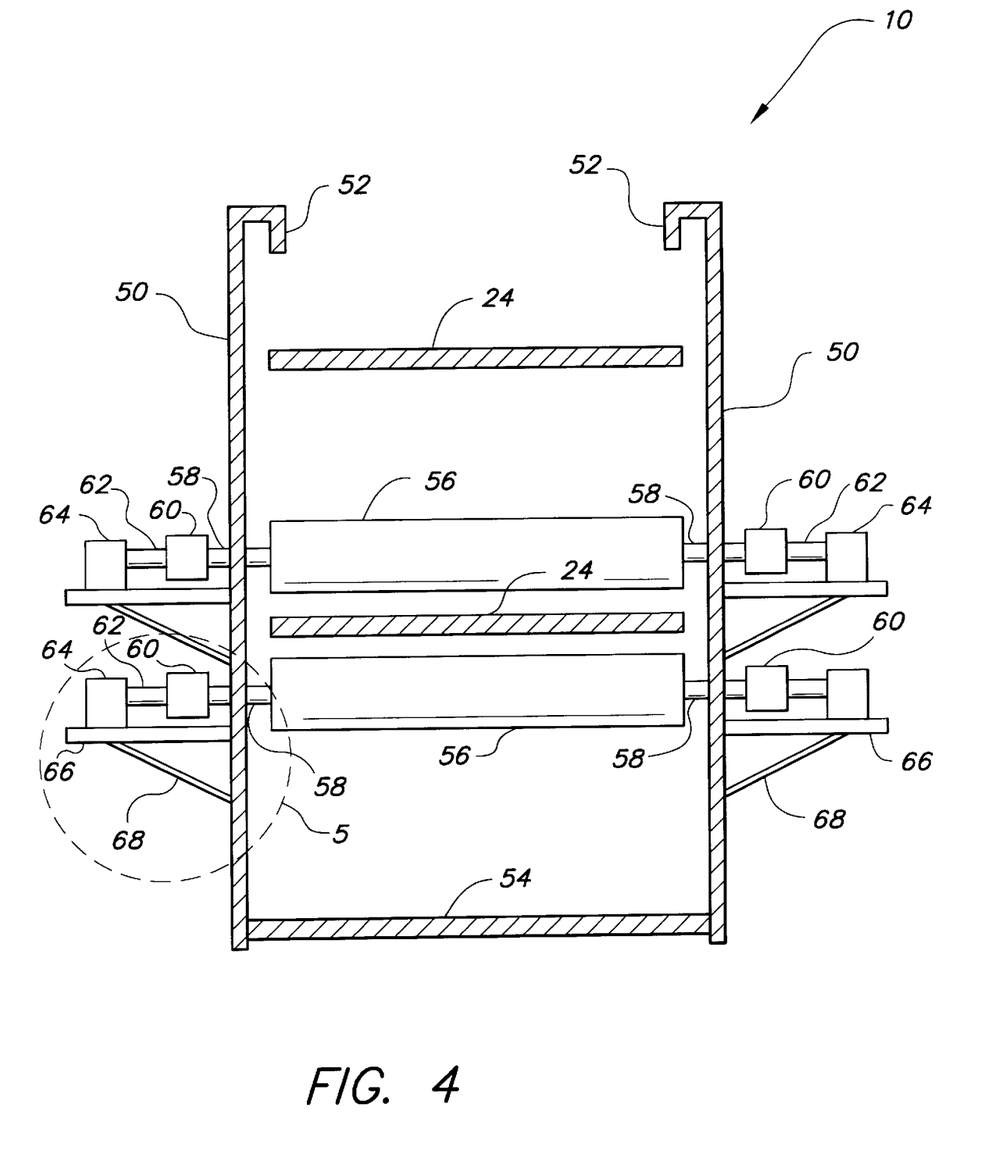
FIG. 4 is a sectional view along the line 4—4 of FIG. 3.
Figure 5:
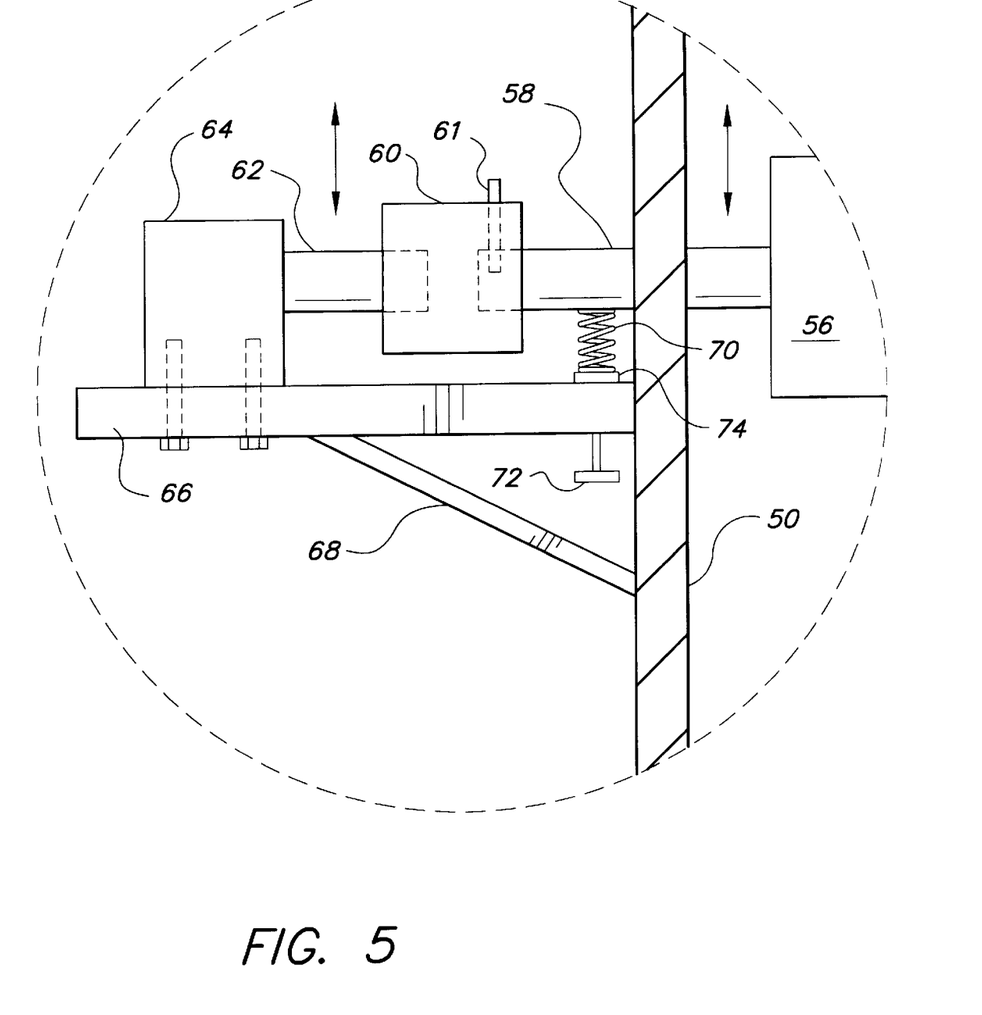
FIG. 5 is an enlarged view of the area 5 in FIG. 4 showing details of the switch platform.

As shown more fully in FIGS. 3, 4, and 5, the monitor 10 includes a pair of vertical standards 50 positioned on opposite sides of the belt 24. The standards 50 have a bracket 52 adapted for mounting the monitor 10 to the frame 22 or for suspending the monitor 10 by means of ropes. The frame includes a cross-member 54 for maintaining proper spacing between the standards 50. The spacing of the standards 50 is adjustable to accommodate belts 24 having different widths. For mining applications, this might commonly include belts of 36" or 48" width.

The monitor 10 includes a pair of sensor rollers 56 mounted on shafts or axles 58 which extend through vertically aligned slots 59 in the standards 50, so that the rollers 56 are disposed between the standards 50. The sensor rollers 56 have a length substantially equal to the width of the belt 24 and are positioned in vertical alignment above and below the belt 24 as the belt 24 traverses the return path from the head roller 26 to the tail roller 28, as is most clearly seen in FIGS. 3 and 4. The clearance between the sensor rollers 56 and the belt 24 is about ¼" to ½", but may be adjusted by the mechanism set forth below.

Referring now to FIG. 5, the axle 58 extends through the standard 50 where it is joined to the switch lever 62 of limit switch 64 by coupler 60, which slides over the switch lever 62 and is secured to the axle 58 by a set screw 61 which threads into a hole defined in the axle 58, retaining the axle at the desired height. The limit switch 64 is secured on a platform 66 extending horizontally from the standard 50 which is supported by a brace 68. The limit switch 64 is a slide switch operated by moving switch lever 62 vertically between on and off positions, the direction of travel being reversed for the upper and lower sensor rollers 56. The axle 58 is supported by a compression spring 70 resting on the platform 66. The height of the axle 58 is adjustable through a small range by a spring adjustment bolt 72 extending through the platform 66 which raises and lowers the spring base plate 74 when the set screw 61 is removed from the axle 58, the end of the coupler 60 attached to the axle 58 being somewhat larger in diameter than the axle 58 to permit adjustment in the height of the sensor roller 56. It will be understood that the monitor 10 includes four limit switches 64, one each connected to the ends of the axles 58 in similar fashion. It will also be understood that the standards 50 may contain a plurality of bolt holes aligned vertically so that the height of the platform 66 may be adjusted according to the height of the belt 24.

In operation, the conveyor belt monitor 10 is mounted astride the belt 24 with the sensor rollers 56 immediately above and below the belt 24 as it traverses the return path from the tail roller 28 to the head roller 26. The advantages of positioning the sensor rollers on the return path include: (1) avoiding false triggering by load material on the top surface of the belt; (2) permitting greater sensitivity, as any load material will fall off the splices by gravity on the return path; and (3) the belt 24 tends to be flatter on the return path, as the belt 24 sags beneath the weight of the load but is flat under tension on the return path. The advantage of having sensor rollers 56 above and below the belt 24 is that (1) a loosened splice may project or cause a developing tear in the belt to bulge on either side of the belt; and (2) when the belt 24 becomes misaligned, it often tilts and spills part of the bulk load on the inside surface of the belt 24 on its return path, which will be detected by the top roller 56.

The sensitivity of the monitor 10 may be adjusted by the conveyor operator by rotating the spring adjustment screws 72 to raise or lower the springs 70 supporting the axles 58 on which the sensor rollers 56 are mounted, thereby adjusting the clearance between the sensor rollers 56 and the belt 24.

As the belt 24 rotates on the conveyor 20, a bulge or projection on the inner or outer surface of the belt 24 causes one of the two sensor rollers 56 to move vertically upwards or downwards in the slot 59. Since the axles 58 on which the rollers 56 are mounted are fixedly attached to the switch lever 62 of the limit switches 64, the switch lever 62 moves, causing the circuitry (not shown) to shut the conveyor 20 down. Although theoretically movement of the belt 24 would stop immediately, as a practical matter, there is often enough delay in stopping the belt 24 that the irregularity in the belt 24 will often pass through the rollers 56 before the belt 24 has completely stopped, whereupon the force of gravity causes the rollers 56 and axles 58 to compress spring 70, thereby resetting switch 64.

This mechanical arrangement of the limit switch 64 is adapted for permitting the movement of the switch lever 62 to cause the circuitry (not shown) to interrupt power to the motor 32 and drive drum 30, and through circuitry well known in the art employing transistors, SCRs, TRIACs, relays, or other means, to prevent the resumption of power to the conveyor 20 after switch 64 is reset unless and until a momentary switch is depressed by the operator. This momentary switch may be hard wired and physically located at the operator's usual work location, either at the discharge roller 26 or the tail roller 28, or it may be operated by a portable remote control unit. Hence, an irregularity in the belt 24 may cause the conveyor 20 to shut down, followed by automatic resetting of the limit switch 64, but without restarting the conveyor 20, so that the limit switch 64 functions as a circuit breaker resettable at the conveyor 20 operator's normal work position, permitting the operator to move the irregularity in the belt 24 to his location, where he can check the splice and either fix the damaged splice, cut off any torn ends, or patch the splice until complete repairs and maintenance can be performed.

Alternatively, the limit switch 64 may simply be spring biased so that it must be manually reset. It will be obvious that operation of the limit switch 64 may also be adapted to drive either a visual or an audio alarm to alert the operator of a belt 24 malfunction. In the preferred embodiment, separate monitors 10 would be installed at least at the discharge roller 26 and the tail roller 28. Additional monitors 10 could be installed in the length of the span of the conveyor 20 wherever the return path of the belt 24 is flat.

Figure 6:
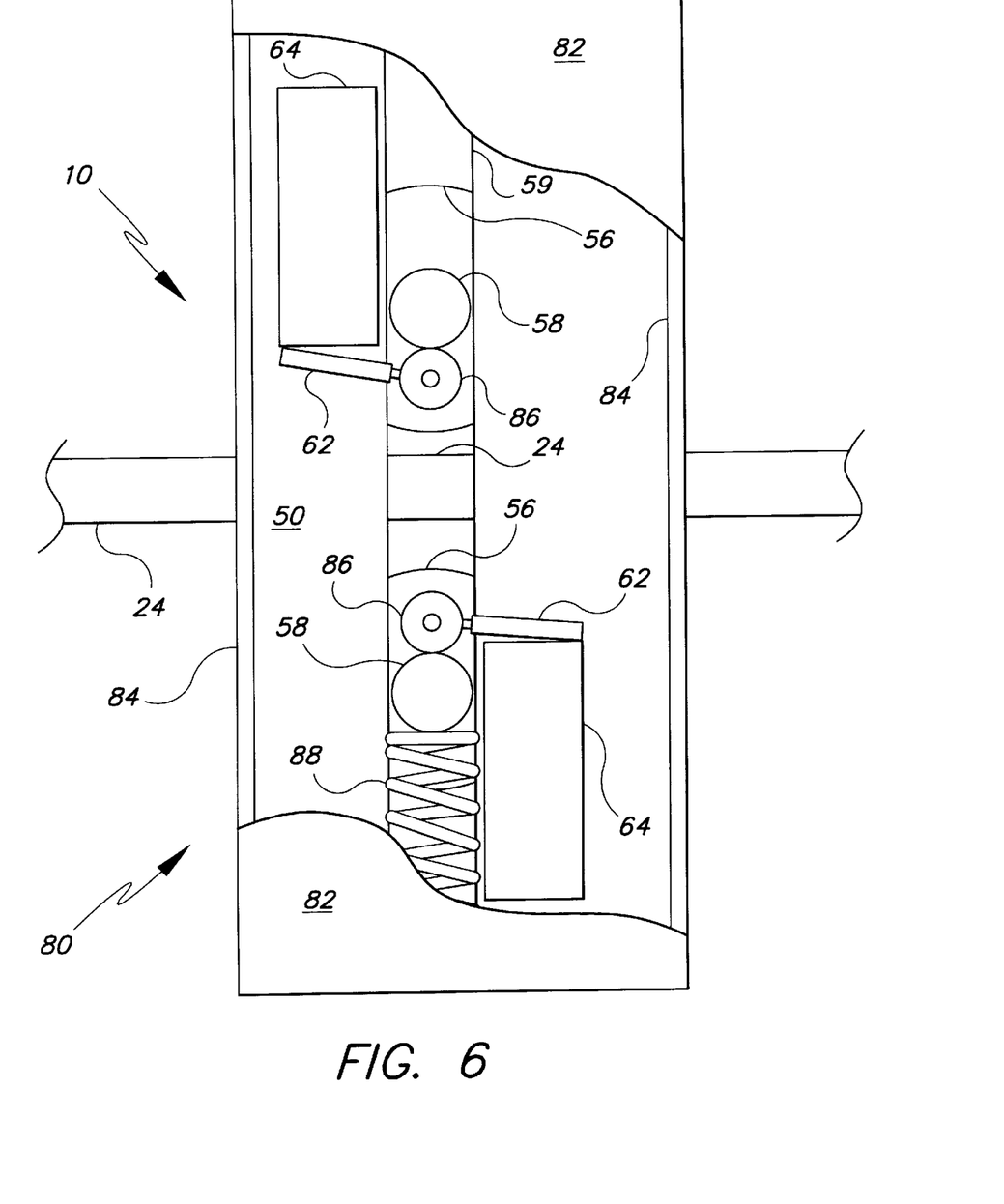
FIG. 6 is an end view of an alternative embodiment of the conveyor belt monitor with parts broken away to show the arrangement of the limit switches.

FIG. 6 shows an alternative embodiment of the conveyor belt monitor 10. In this embodiment the positioning of the standards 50 and the rollers 56 are the same as shown in FIG. 3, the only difference being in the mounting of the limit switches 64. In the alternative embodiment the limit switches 64 are enclosed in a cover 80 including an outside wall 82 and two opposing side walls 84. The outside wall 82 is broken away in FIG. 6 to provide a view of the limit switches 64. The limit switches 64 may be attached to the standard 50 or to the cover 80 by an conventional means known in the art.

The limit switches 64 in FIG. 6 each have a spring biased lever arm 62 with a sensor roller 86 at the free end of the arm 62 in contact with the axle 58 of the roller 56. When the roller 56 detects a tear or twist in the top side of the belt 24, the axle 58 of the top roller 56 rises vertically in the slot 59, causing the bias spring to raise the switch lever 62, thereby stopping the conveyor belt 24, the switch 64 being reset as the tear or twist passes through the rollers 56 and the axle descends by gravity, although the belt 24 remains stopped as described above. Similarly, when the bottom roller 56 detects a tear or twist on the bottom side of the belt 24, the axle 58 of the bottom roller 56 is pressed downward vertically, pressing the switch lever 62 down, stopping the conveyor belt 24. The axle 58 of the bottom roller 56 is supported by a compression spring 88. Consequently, as the tear or twist passes through the rollers 56, the spring 88 forces the axle back up to reset the limit switch 64, the bias spring forcing the switch lever 62 up.

It is to be understood that the present invention is not limited to the sole embodiments described above, but encompasses any and all embodiments within the scope of the following claims.

I claim:

1. A conveyor belt monitor for use with a belt conveyor, comprising:
   a) a pair of standards, each standard having a bracket adapted for mounting said monitor and having a vertically aligned slot defined therein;
   b) a cross-member connecting said pair of standards, whereby the spacing between said standards is kept constant;
   c) a pair of sensor rollers having a length substantially equal to the width of the belt;
   d) a pair of axles, each said sensor roller being mounted on one of the axles, the ends of the axles extending through the slots defined in said standards, whereby said sensor rollers are disposed between said standards and are aligned one above the other and are moveable vertically;
   e) a plurality of limit switches for controlling the movement of the conveyor, each of the limit switches being mounted on a platform extending horizontally from said standards, said limit switches being connected to said axles in order to actuate said switches by vertical movement of said rollers; and
   f) wherein said sensor rollers are adapted for being positioned immediately above and below the belt on its return path whereby a protuberance on the belt will actuate at least one of said limit switches in order to stop the conveyor.

2. The conveyor belt monitor according to claim 1, further comprising sensitivity adjustment means for adjusting the clearance between said sensor rollers and the belt.

3. The conveyor belt monitor according to claim 2, wherein said sensitivity adjustment means comprises:
   a) a plurality of compression springs mounted between said pair of axles and said platforms;
   b) a plurality of spring adjustment bolts, each said bolt being mounted at the bottom of one of said compression springs, whereby said spring adjustment bolt is capable of raising and lowering said spring; and
   c) a plurality of set screws insertable in said pair of axles for fixing the height of said sensor rollers.

4. The conveyor belt monitor according to claim 1, wherein said limit switches further comprise a switch lever connected to an end of one of said axles, said limit switch being electrically connected to a circuit so that a movement of said axle in a vertical direction caused by a protuberance on the belt moves the switch lever to a position stopping the conveyor, and so that a movement of said axle in the opposite direction moves the switch lever to a position electrically resetting said limit switch.

5. A conveyor belt monitor for use with a belt conveyor, comprising:
   a) a pair of standards, each standard having a bracket adapted for mounting said monitor and having a vertically aligned slot defined therein;
   b) a cross-member connecting said pair of standards, whereby the spacing between said standards is kept constant;
   c) a pair of sensor rollers having a length substantially equal to the width of the belt;
   d) a pair of axles, each said sensor roller being mounted on one of the axles, the ends of the axles extending through the slots defined in said standards, whereby said sensor rollers are disposed between said standards and are aligned one above the other and are moveable vertically;
   e) a plurality of limit switches for controlling the movement of the conveyor, each of the limit switches being mounted on one of said standards, said limit switches being connected to said axles in order to actuate said switches by vertical movement of said rollers; and
   f) wherein said sensor rollers are adapted for being positioned immediately above and below the belt on its return path whereby a protuberance on the belt will actuate at least one of said limit switches in order to stop the conveyor.

6. The conveyor belt monitor according to claim 5, further comprising a pair of compression springs, the compression springs abutting the axle of the lower roller of said pair of sensor rollers.

7. The conveyor belt monitor according to claim 5, wherein each of said limit switches further comprises a spring biased switch lever having a roller in abutting contact with one of said axles, whereby vertical movement of said axle caused by a protuberance on the belt moves the switch lever to a position stopping the conveyor, and whereby vertical movement of said axle in the opposite direction moves said switch lever to a position electrically resetting said monitor.

* * * * *